United States Patent [19]

Wilhelm et al.

[11] 4,262,403

[45] Apr. 21, 1981

[54] VALVE SPRING COMPRESSOR TOOL

[75] Inventors: Kenneth W. Wilhelm, Elyria; Ralph R. Bellino, Cleveland, both of Ohio

[73] Assignee: W. R. Grace & Co., New York, N.Y.

[21] Appl. No.: 12,776

[22] Filed: Feb. 16, 1979

[51] Int. Cl.$^3$ .............................................. B23P 19/04

[52] U.S. Cl. ...................................................... 29/220

[58] Field of Search .......................... 29/215, 219, 220

[56] References Cited

U.S. PATENT DOCUMENTS

| | | | |
|---|---|---|---|
| 1,858,372 | 5/1932 | McNaught et al. | 29/215 |
| 2,428,182 | 9/1947 | Stark | 29/219 |
| 2,627,653 | 2/1953 | Wisner | 29/220 |
| 2,940,166 | 6/1960 | Moore | 29/219 |
| 3,237,463 | 3/1966 | McPherson | 269/228 |

FOREIGN PATENT DOCUMENTS

| | | | |
|---|---|---|---|
| 1029257 | 3/1953 | France | 29/215 |
| 164188 | 6/1921 | United Kingdom | 29/219 |

*Primary Examiner*—James L. Jones, Jr.
*Attorney, Agent, or Firm*—Edward J. Cabic

[57] ABSTRACT

A valve spring compressor tool has a tubular member that screws at one end on to the rocker arm stud and has a body portion linked at the opposite end that slides down the tubular member. By pulling down on the handle of a bell crank type linkage, a position adjustable extending U-shaped finger element attached to the body portion engages the top of the adjacent valve spring and compresses the spring. An over-center feature of the linkage holds the spring in the compressed condition. The tubular member has different size threads at each end and can be inverted to fit each of the two standard size rocker arm stud threads.

18 Claims, 7 Drawing Figures

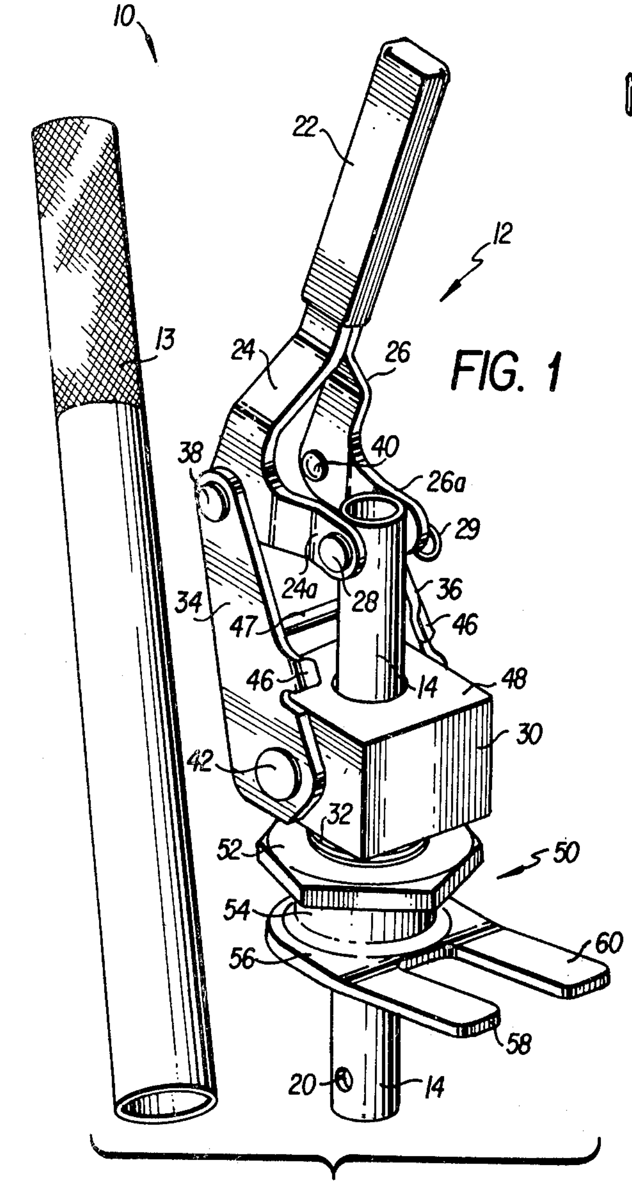
FIG. 1
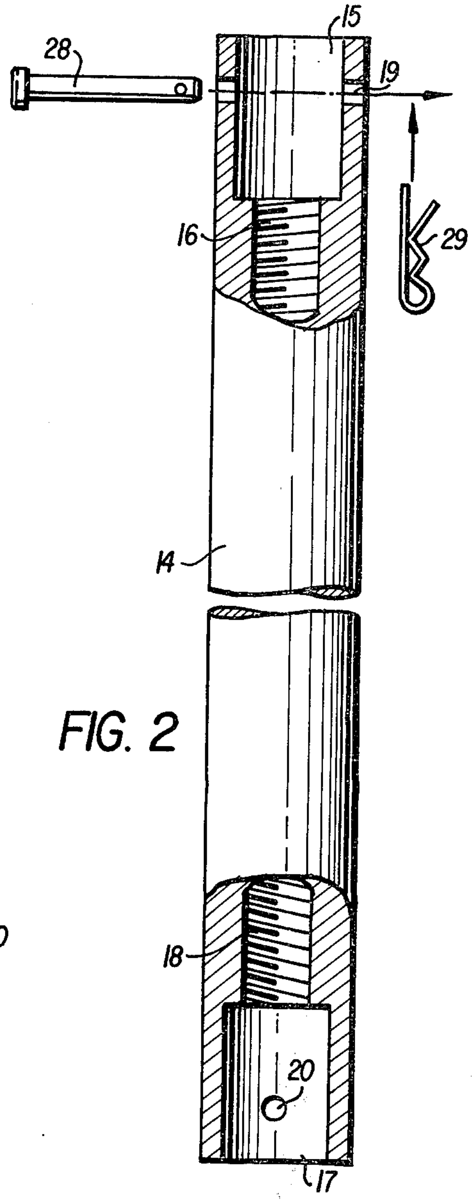
FIG. 2
FIG. 5
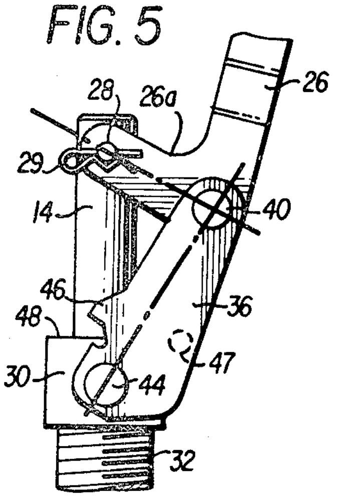
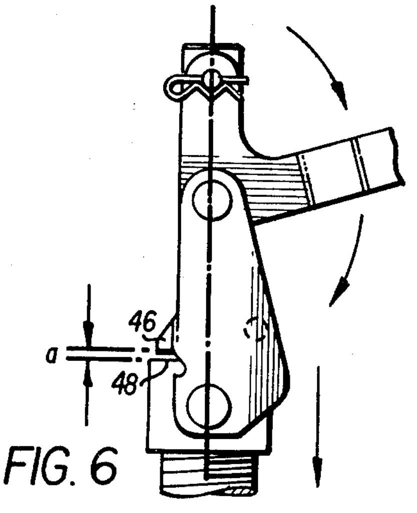
FIG. 6
FIG. 7
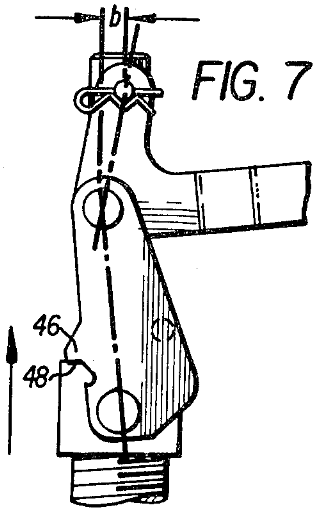

VALVE SPRING COMPRESSOR TOOL

BACKGROUND OF THE INVENTION

1. Field of the Invention

This invention relates to a tool for use in compressing engine valve springs. The tool attaches to a rocker arm stud. By moving the handle to the compressed position, an adjustable spring compressing element straddling the valve stem compresses the spring.

2. Description of the Prior Art

Previously, work on a valve train required time-consuming procedures. One method involves removing the head of the engine and using a C-type clamp to compress the spring. Another procedure involves a very time consuming tool set-up procedure which permits a valve compressor to move from valve spring to valve spring and only fits certain head castings.

A third procedure used with stud mounted rocker arm heads involves a tool that pivots about the stud. The tool consists of a bar handle with an opening in it that fits over the stud with a nut screwed onto the stud to retain the bar. The bar also has a bent portion that acts as a fulcrum, and the remaining portion of the bar contacts the valve spring. In operation the handle end is pressed down to compress the spring. Since the handle must be continually held down to compress the spring, only one hand is free to remove or install the valve lock.

Another tool hooks onto the spring coil itself and compresses it by means of a screw mechanism that clamps down on the valve spring retainer. Using this tool is a very time consuming procedure, and it does not work well with high tension springs.

SUMMARY OF THE INVENTION

The present invention relates to a valve spring compressor tool which is able to be locked in a closed position by applying a positive, even pressure to the handle, which thereby compresses the valve spring. The tool is constructed to permit the handle to rotate 360° about the rocker arm stud so the handle can be cleared of any obstruction. The tool comprises a central support rod which screws onto the rocker arm stud. At the opposite end of the rod there is pivotably mounted a handle. Surrounding the rod is a body element having a threaded portion extending down in a direction towards the threaded end of the support rod. Interconnecting links connect the body element to a portion of the handle spaced from the pivotal portion where the handle engages the support rod.

Threaded onto the threaded portion extending from the body element is a valve spring engaging unit consisting of a spacer element with a flange having two fingers outwardly extending in a generally U-shaped configuration. To secure the unit to the body element and to provide the handle clearance by rotation of the handle, an adjustable jam nut is positioned on the threaded portion of the body element to engage the annular member and lock it in place.

The preferred embodiment utilizes a removable and reversible central support rod that is internally tapped at one end with a 7/16 inch thread and at the other with a $\frac{3}{8}$ inch thread. A perpendicular hole drilled at each end of the support rod permits insertion of the pivot pin when that end is positioned at the top. To change the device for attachment to a rocker arm stud of the other thread size, first the pivot pin is removed, the support rod is removed and reinserted upside down and then the pivot pin is replaced.

In operation, the support rod is screwed onto the rocker arm stud and the U-shaped element is rotated so it is above the valve spring and straddling the valve stem. The support rod and handle are finally rotated to the desired position where the handle will have the proper clearance and the jam nut is tightened to lock the two parts of the tool together. Then by pulling down either the handle or a tubular extension that fits over the handle, the linkage between the handle and the body element causes the body element to slide down the support rod, and this in turn forces the two fingers of the generally U-shaped flange to press against the valve spring and compress the spring. The handle is capable of being pulled down to the point where the pivot pin passes over center in the linkage so the tool remains in a stable, locked position with the spring compressed.

After the stem lock has been removed, the handle can be returned back to the open, starting position to release the compression on the spring. Then by swiveling the entire tool about the rocker arm stud, the two fingers can be rotated out of the way to permit replacement of the spring, or other work on the valve train. After a spring is placed back over the valve stem and the tool is swiveled back to its original position, the spring can then be compressed again to permit installation of the valve stem lock. Finally, the tool is removed by reversing the above steps.

BRIEF DESCRIPTION OF THE DRAWINGS

FIG. 1 is a perspective view of the valve spring compressor tool and its associated handle extension.

FIG. 2 is a partial sectional view of the central support rod.

FIGS. 5–7 are a set of partial schematic views showing the over the center locking feature.

DESCRIPTION OF THE PREFERRED EMBODIMENTS

The valve spring compressor tool as shown in FIG. 1 comprises the complete unit 10 composed of the valve spring compressor tool 12 and an associated extension handle 13 which slips over the tool handle to provide additional leverage when compressing the spring.

Figure 3:
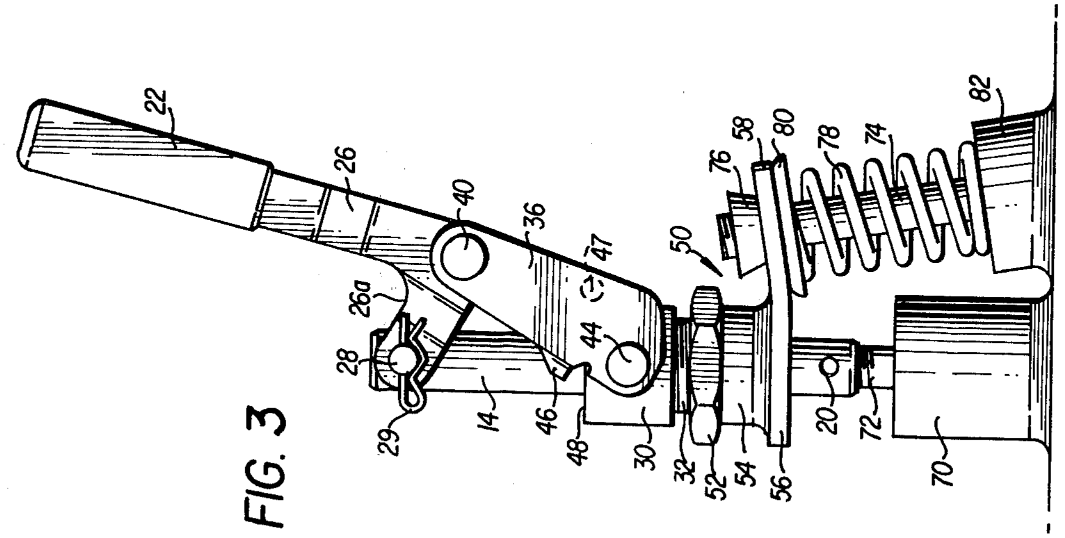
FIG. 3 is a side view of the compressor tool in operation after it has been screwed onto the rocker arm stud and prior to compressing the spring.

The compressor tool 12 comprises a central support rod 14 having a handle 22 attached to one end and at the opposite end having an opening 17 (shown in FIG. 2) inside of which there is an internally threaded portion 18 of a diameter to threadably engage a rocker arm stud 72 (shown in FIG. 3). Conventional threads used on rocker arm studs are 7/16–20 and $\frac{3}{8}$–20. The central support rod can be made with this one end drilled and tapped to one of these two sizes. Thus in one embodiment, to work on different engines having the two different size rocker arm studs, two different valve spring compressor tools would be required.

The preferred embodiment, as shwon in FIGS. 1 and 2, has the central support rod 14 modified so that one end is drilled and tapped for a 7/16 inch thread while the other end is drilled and tapped for a $\frac{3}{8}$ inch thread. For example, the bottom end shown in FIG. 2 has a drilled opening 17 in which is tapped a 7/16 inch thread, while the top end has a drilled opening 15 in which is tapped a ⅜ inch thread. Both ends have diametrically drilled openings 19 and 20 positioned between the threaded portion and the end of the rod through which the pivot pin 28 is inserted to hold the central support rod in place in the device. In FIG. 2 the bottom portion has been rotated 90° to show the opening 20. The pivot pin 28 is maintained in place by a pin such as a cotter pin or the hairpin 29 illustrated, which is easy to remove.

The handle 22 for the device can preferably be made of two spaced apart bell crank shaped pieces 24 and 26 which join together at one end to form the handle. The handle can be covered with a suitable material to provide a better grip, such as rubber or a plastic. Each of these handle side components 24 and 26 has an extension 24*a* and 26*a*, respectively, which pivotally engages the end of the central support rod 14 by means of pivot pin 28.

Positioned on the central support rod 14 is the body element 30 which is a block type structure that can be of a square or rectangular configuration and which has a central hole to permit it to slide up and down on the support rod 14. On the bottom end of the body element 30 as shown in FIG. 1 is an externally threaded tubular portion 32 extending down along and around the support rod 14.

The body element is connected to the handle 22 by a pair of interconnecting linkage elements 34 and 36. The first interconnecting linkage element 34 is pivotally connected to the handle side component 24 by a pivot pin 38, and the interconnecting linkage element 36 on the other side is connected to the corresponding handle side component 26 by pivot pin 40. The opposite ends of each of these interconnecting linkage elements are secured to the main body 30 by pivot pin 42 for interconnecting element 34 and by pivot pin 44 (shown in FIG. 3) for the other side linkage element 36.

The interconnecting linkage elements are preferably pivotably attached to the bell cranks 24 and 26 at the corners where the handle extensions 24*a* and 26*a* join the ends of handle side components 24 and 26 as shown in FIG. 1.

The construction of the device described so far is generally disclosed by McPherson in U.S. Pat. No. 3,237,463, and the type of double acting plunger clamp described in the patent is manufactured by the De-Sta-Co Corporation of Detroit, Michigan. To obtain the device described so far in FIGS. 1 and 2, the rivet holding the central support pin of the commercial device must be replaced with the pivot pin, holes of the two proper sizes must be drilled and tapped in each end and an additional hole must be drilled perpendicular to the rod near the original bottom end to insert the pivot pin through it when that end is positioned on top.

The device made by De-Sta-Co also has stop projections 46 on each of the interconnecting linkage elements 34 and 36. These projections bend out of the plane of the interconnecting linkage element and extend in toward the support rod 14. They will engage the top surface 48 of the body element 30 to prevent further rotation of the interconnecting linkage elements 34 and 36 about pivot pins 42 and 44 as will be discussed later in connection with FIGS. 5–7. The device also has a stop bar 47 on the opposite side of linkage elements 34 and 36 that attaches to the two linkage elements. This bar will contact the central support rod 14 to also prevent further rotation as will be discussed later in connection with FIGS. 5–7.

The bottom portion of the device as shown in FIG. 1 comprises a valve spring engagement unit 50 consisting of a lock nut or jam nut 52, which is threaded so as to engage the threaded tubular portion 32 of the body element 30. Below the nut 52 is a coaxial tubular spacer element 54 that is internally threaded to also engage the threaded tubular portion 32. Attached to the bottom end of the spacer element 54 is a flange piece 56 which has two outwardly extending fingers 58 and 60 which form a generally U-shaped extension. The flange piece 56 can be attached by welding it to the tubular spacer element 54. These two extending fingers are spaced apart to permit movement of the valve stem between them. Since the valve stem 74 is of an angle with respect to the support rod 20, the extending portions of the fingers 58 and 60 are slightly tilted upward so the bottom surface of the fingers will be parallel to the top surface of the valve spring retainer 80 as shown in FIG. 3. This advantageously permits maximum surface contact between the fingers and the valve spring retainer when the spring is compressed.

In the preferred operation of the device to compress a valve spring, the central support rod end 17 is first screwed onto a rocket arm stud 72 as shown in FIG. 3, and preferably to about one-inch of thread engagement. The valve spring engagement unit 50 is positioned by rotating spacer element 54 about the threaded tubular portion 32 so that the two extension fingers 58 and 60 straddle the valve stem 74.

Figure 4:
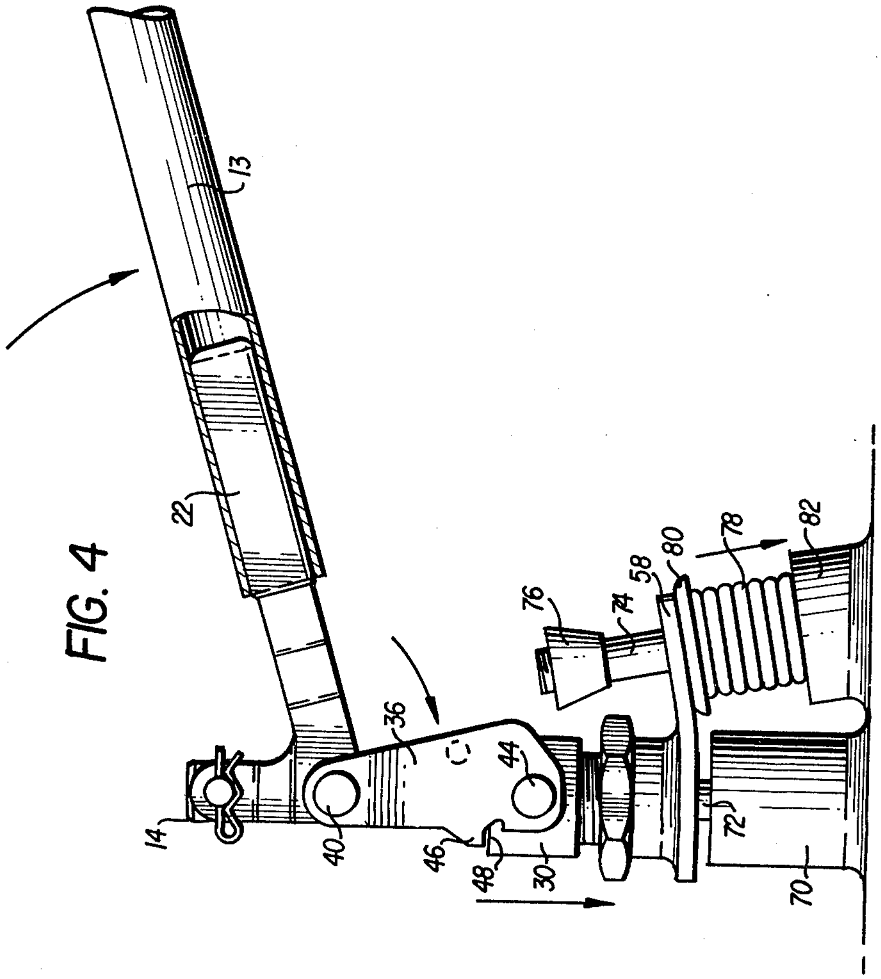
FIG. 4 is similar to FIG. 3, showing the spring compressed.

The valve spring 78 shown in FIG. 3 is held in the normal extended position by a valve spring retainer 80 which is secured to the end of the valve stem 74 by a securing element which here is shown by a split lock 76 in FIG. 4. Other conventional valve spring securing mechanisms can also be employed on the end of the valve stem such as a nut. After the extension fingers 58 and 60 have been aligned in place, the handle 22 can be rotated about the vertical axis extending through the central rod 14 to select the proper handle orientation so that when the handle is eventually pulled down the handle extension will not hit any obstruction such as a fender wall, manifold, etc.

Once the handle has been swiveled into the desired position the jam nut 52 is tightened to secure together the valve spring engagement unit 50 and the body element 30. To compress the spring, the handle 22 is pulled down, as indicated by the arrows in FIG. 4. In the preferred embodiment the tubular handle extension 13 is placed over the handle 22 to provide additional leverage. By pulling down on the opposite end of the extension handle 13 the handle 22 is rotated down to the closed position as shown in FIG. 4 where the stop projections 46 engage the top surface 48 of the body element 30. This handle rotation causes the interconnecting linkage elements 34 and 36 to move down along the central support rod 14 which in turn forces the body element 30 down along the rod, the rod 14 being fixed in position on stud 72. The attached valve spring engagement unit 50 is simultaneously moved along the rod 14 so the two upwardly tilted extension fingers 58 and 60 force the spring 74 into a compressed position as shown in FIG. 4.

Referring to FIGS. 5–7, the linkage between the handle elements 24 and 26, their extension pieces 24*a* and 26*a*, the interconnecting links 34 and 36, and the stop projections 46 form an over center handle locking mechanism. As seen in FIG. 5, in the open position the center of pivot pin 40, which is the vertex pivot of the bell crank, is to the right of a center vertical line passing through pivots 28 and 44. Then as the handle 22 is pulled down the pivot 40 comes to the centerline between pivots 28 and 44, as shown in FIG. 6, where it is unstable. If the handle were left balanced here, the slightest motion of the handle could cause the pivot 40 to move to the right where the compressed spring would quickly force the handle back up to the open position, which would almost surely injure the operator. Instead, in the operation of the device the handle is pulled down further to the position shown in FIG. 7 where pivot 40 is over center, i.e., to the left to the vertical line and lightly up from the position in FIG. 6. The handle will not move any further down under the influence of the force of the compressed spring because the stop projections 46 contact the top surface 48 of the body element. In addition the stop bar 47 will also contact the central support rod 14 to further prevent any downward movement of the handle. With the handle in this over-center position shown in FIG. 7, the spring is compressed and the tool is in a stable, locked configuration with no additional force needed to be exerted on the handle. With the spring thus locked in this compressed position, it is possible to use both hands to remove the valve stem split lock 76 and to do other work.

To move the handle back to the open position, a force may be applied to initially pull up on the handle to have the pin 40 pass back to the centerline, slightly compressing the spring, after which the force exerted by the compressed spring will cause the handle to return to the open position. Upon bringing the handle of the device back to the open position shown in FIG. 3, the pressure on the spring is released so the spring can be removed.

One of the advantages of the present device is that once the handle has been returned up to the open position to release the pressure on the spring, the entire tool can be swiveled about rocker arm stud 72 so that the two extending fingers 58 and 60 rotate back to a position where they are completely out of the path of the spring. The spring can be removed and the work done on the valve without having to remove the compressor tool from the rocker arm stud. After the valve work has been done and the spring is replaced, the entire tool is again swiveled back into the original position where the two arms 58 and 60 straddle the valve stem. By pulling the handle of the device down to the closed position using the handle extension 13, the spring is again compressed to permit reassembly of the valve stem split lock 76. The handle is finally released to release the pressure on the spring. Thereafter the device can then be unscrewed from the rocker arm stud 72 and removed.

What is claimed is:

1. A valve spring compressor tool comprising
- a support rod having an internal portion threaded at one end to threadably engage a rocker arm stud;
- a handle pivotally connected to the other end of the support rod by first pivot means;
- a body element extending along and slidably mounted on said support rod;
- interconnecting linkage means pivotally connected to said body element by second pivot means and pivotally connected to said handle by third pivot means;
- said first and third pivot means on said handle being in spaced relation to each other; and
- valve spring engaging means on said body element comprising extending finger members to engage the valve spring, whereby when the support rod is mounted on a rocker arm stud and the handle is moved to the spring compressed position, the body element is lowered on the support rod and the valve spring engaging means engages and compresses the valve spring.

2. A valve spring compressor tool according to claim 1, wherein said support rod has an internal portion threaded at each end with a different size thread and a diametrical opening at each end adapted for engagement with the first pivot means.

3. A valve spring compressor tool according to claim 1, further comprising means to adjustably engage said valve spring engaging means with said body element.

4. The valve spring compressor tool according to claim 1, wherein the threaded portion of the body element is an annular threaded extension and the valve spring engaging means further comprises an adjustable jam nut on the threaded portion of the body element which secures the annular member of the valve spring engaging means in non-rotatable threadable engagement with the threaded portion of the body element.

5. The valve spring compressor tool according to claim 1, wherein the annular member of the valve spring engaging means is internally threaded at at least one end to threadably engage the threaded portion of the body element, and the two finger members extend from the other end to form a generally U-shaped flange configuration with sufficient spacing to permit passage therethrough of a valve stem.

6. The valve spring compressor tool according to claim 5, wherein the two finger members tilt slightly upward from a plane perpendicular to the axis of the support rod as the finger members extend from the annular member so as to extend substantially parallel to the top of the valve spring.

7. The valve spring compressor tool according to claim 1, further comprising a tubular extension handle adapted for engagement with the handle.

8. A valve spring compressor tool according to claim 1, wherein the first and second pivot means are positioned to define a connecting line substantially parallel to the axis of the support rod, and the third pivot means is positioned to travel across said connecting line when the handle is moved to the compressed position, whereby an over-center lock in the spring compressed position is provided.

9. A valve spring compressor tool according to claim 8, further comprising a stop means on said interconnecting linkage means which engages the body member to prevent further movement of the handle after the third pivot passes said connecting line whereby the tool is maintained in a stable, spring compressed condition.

10. A valve spring compressor tool according to claim 8, further comprising a stop means positioned between the interconnecting linkage means which engages the support rod to prevent further movement of the handle after the third pivot passes said connecting line whereby the tool is maintained in a stable, spring compressed condition.

11. An engine valve spring compressor tool comprising a straight rod, means for attaching the lower end of said straight rod directly to a rocker arm stud on an engine, a body member slidably mounted on said rod, an over-center linkage interconnecting said rod and said body member, a handle for operating said linkage, and valve spring engaging means on said body member for compressing a valve spring in the over-center locked position of said linkage.

12. An engine valve spring compressor tool according to claim 11, wherein the over-center linkage comprises a linkage element having one end pivotally connected to the body member, and a bell crank having one end connected to the handle, the other end pivotally connected to the end of the rod and the vertex pivotally connected to the other end of the linkage element, whereby when the handle is moved to the compressed position the vertex pivot travels across a center line between the other two pivots to provide the over-center lock.

13. An engine valve spring compressor tool according to claim 12, wherein a bell crank and linkage element on opposite sides of the body member have their two handle ends joined together to form a unitary handle.

14. An engine valve spring compressor tool according to claim 11, further comprising a tubular extension engaging the handle and extending therefrom.

15. An engine valve spring compressor tool according to claim 11, wherein the internal end of the rod has threads to threadably engage the rocker arm stud of the engine.

16. An engine valve spring compressor tool according to claim 15, wherein both ends of the rod are internally threaded with different size threads.

17. An engine valve spring compressor tool according to claim 11, wherein the valve spring engaging means has two fingers projecting out to straddle the valve stem and to engage the valve spring.

18. An engine valve spring compressor tool according to claim 11, wherein the body member has a threaded annular extension coaxial with the support rod and an associated jam nut and wherein the valve spring engaging means threadably engages said body member extension with said jam nut locking the two parts together.

* * * * *